United States Patent [19]

Kindig

[11] 4,089,254
[45] May 16, 1978

[54] STRIP MATERIAL FEED ROLLER ASSEMBLY

[75] Inventor: Alan L. Kindig, Holland, Mich.

[73] Assignee: General Electric Company, Fort Wayne, Ind.

[21] Appl. No.: 535,101

[22] Filed: Dec. 20, 1974

[51] Int. Cl.² .................... B65G 39/07; H02K 15/10
[52] U.S. Cl. ...................................... 93/1 R; 29/125; 198/624
[58] Field of Search .......................... 93/1 R; 83/156; 198/127 R, 624; 193/37; 29/125

[56] References Cited

U.S. PATENT DOCUMENTS

| 1,292,244 | 1/1919 | Brown | 29/125 |
|---|---|---|---|
| 1,508,673 | 9/1924 | Bingham | 226/114 |
| 2,326,670 | 8/1943 | Patterson, Jr. | 226/175 |
| 2,428,965 | 10/1947 | Frisco et al. | 29/121 A |
| 2,658,262 | 11/1953 | Clements | 29/125 |
| 3,377,824 | 4/1968 | Moyer | 66/132 |
| 3,447,351 | 6/1969 | Werntz | 29/125 |
| 3,537,631 | 11/1970 | Fujii | 226/191 |
| 3,650,447 | 3/1972 | Muka | 226/34 |
| 3,667,096 | 6/1972 | Edsmar | 29/125 |

*Primary Examiner*—Neil Abrams
*Attorney, Agent, or Firm*—Ralph E. Krisher, Jr.

[57] ABSTRACT

A roller assembly for feeding strip material, the roller having a first portion and a second portion. The first portion is of greater diameter than the second portion while the second portion has a threaded section at a distance from the first portion. A resilient sleeve is fitted on the second portion adjacent to the first portion, and then a threaded retainer is screwed onto the second portion to hold the resilient sleeve in place and to compress the resilient sleeve against the first portion.

7 Claims, 7 Drawing Figures

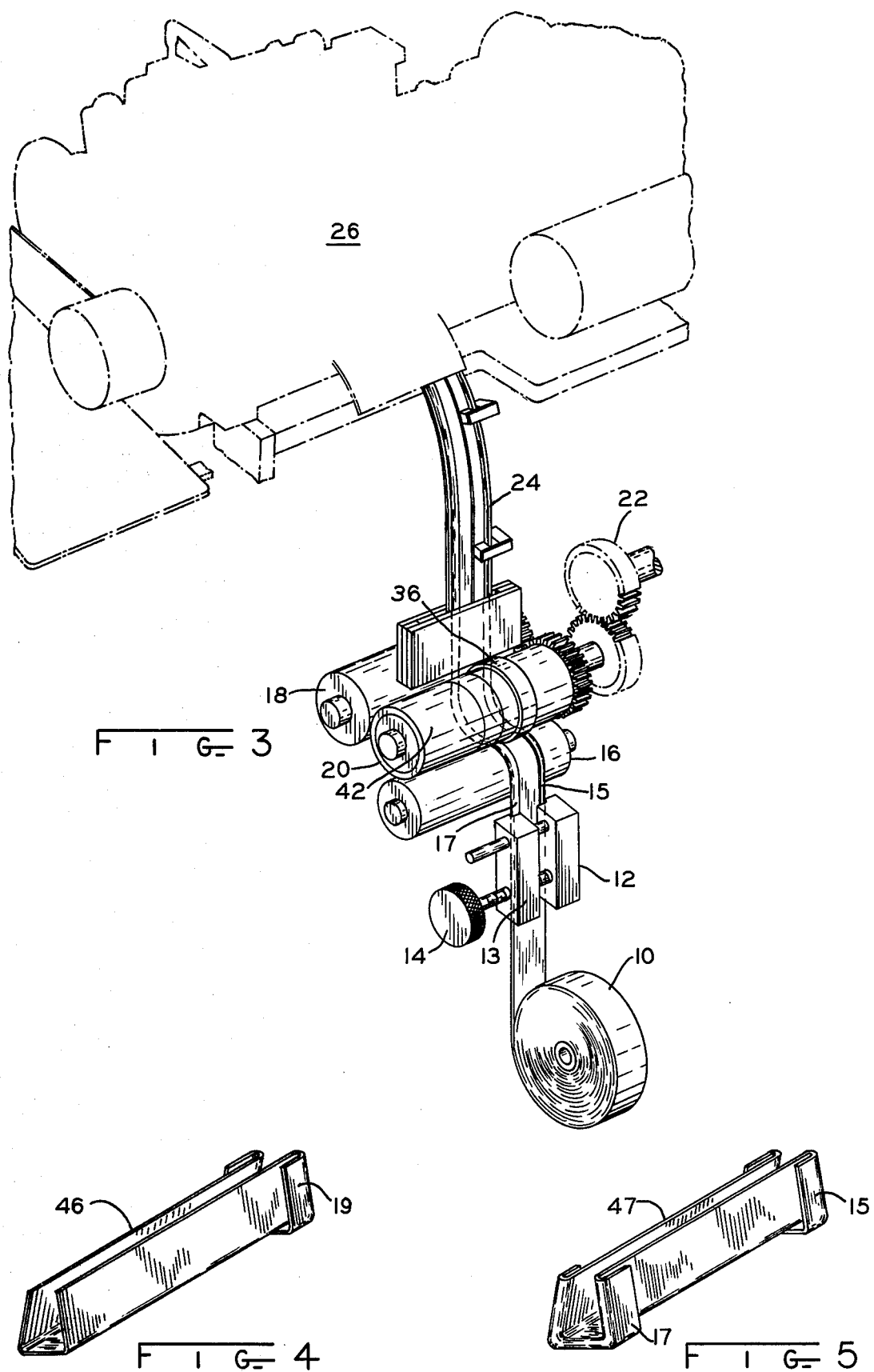

STRIP MATERIAL FEED ROLLER ASSEMBLY

BACKGROUND OF THE INVENTION

The present invention relates to a roller assembly for feeding strip material. More particularly, the present invention relates to an improved feed roller assembly for use in apparatus wherein insulators, such as slot liners for dynamoelectric motors, are formed.

In the fractional horsepower motor art, stator core ground insulation often is in the form of slot liners that may be made from electrical insulating paper or from a polymerized material such as e.g., polyethylene terephthalate which may be purchased under the trade name "MYLAR" from E. I. du Pont de Nemours and Company. Slot liners may have a fold at one or both ends which form cuffs. When polymerized strip material is used it is often necessary to use a rubber coated feed roller to provide a consistent drive for the strip material because the friction characteristics of a smooth metallic roller usually are such that the driving action provided thereby is not sufficient to properly feed the strip material, without slippage, through slot liner forming apparatus. When electrical insulating paper is used, the feed rollers must avoid "ironing" or overpressing the fold in the slot liner and thereby rendering the cuff overly flat, yet the need for a consistent feed of material dictates that the roller maintain a proper driving relationship with the insulating paper.

In the past, feed rollers have been manufactured with a groove machined in the surface thereof, and rubber was molded therearound. The rubber was then ground so that its outer diameter was slightly greater than that of the grooved roller surface. When slot liner material was fed, the slot liner stock was then positioned relative to the feed roller so that the rubber was between the cuffs, and the rubber provided the drive for the insulating material. One of the disadvantages of this arrangement was that when wider slot liners were to be made and handled, the rubber was not wide enough to provide a consistent feed. On the other hand, if the rubber portion was made too wide, overpassing of the cuffs would result when a narrow slot liner was fed past the roller.

Heretofore, as the rubber part of a feed roller has worn down, its outer diameter decreased and then the distance between the rubber portion of the roller and an adjacent pinch roller increased, with the result that the rollers would have to be readjusted in order to properly drive the strip material. As the space between the rollers was decreased, however, more pressure would be applied to the multiple layers of strip material along the cuffs, and the cuffs would become "ironed" over or flattened. It should be noted that when the cuff is flattened objectionably it will not spring out after insertion into the slot of a magnetic core and thus it will not lock into position. This of course can result in a slot liner that is not in a desired proper position relative to a core slot during injection or placing of magnet wire into the core.

In view of the foregoing, it should now be understood that it would be desirable to provide an improved feed roller that would solve the above and other problems.

Accordingly, one of the objects of the present invention is to provide a roller assembly wherein a resilient feeding portion can be easily replaced.

Another object of the invention is to provide an improved roller assembly wherein the width of a resilient feeding portion of a feed roller may be readily changed.

Yet another object of the present invention is to provide a feed roller assembly for use in an insulator fabricating machine wherein the outer diameter of a resilient portion of the roller may be increased or decreased by a simple adjustment.

SUMMARY OF THE INVENTION

In carrying out the above and other objects of the invention in one form, I provide an improved roller assembly for use in strip feeding apparatus. One illustrated roller assembly has a core or body which has rotatable mounting means and a threaded portion. A resilient sleeve surrounds a predetermined portion of the core and has a friction drive surface to frictionally drive an electrical insulating material by pinching the insulating material against another roller. Threaded means are screwed on the core so that a compressive force is supplied to the resilient sleeve. The compressive force applied by the threaded means can be increased or decreased to thereby increase or decrease the outer diameter (and inversely change the width) of the resilient sleeve. The roller construction permits replacement of the resilient sleeve so that a resilient sleeve of a different width, or a new resilient sleeve may be installed.

The subject matter which I regard as my invention is set forth in the appended claims. The invention itself, however, together with further objects and advantages thereof, may be better understood by referring to the following detailed description taken in conjunction with the accompanying drawings.

BRIEF DESCRIPTION OF THE DRAWINGS

FIG. 3 is a schematic perspective view with parts removed and parts in phantom of one form of apparatus in which the improved roller assembly may be used.

FIG. 4 is a perspective view of a dynamoelectric machine slot liner having one cuffed end;

FIG. 5 is a perspective view of a dynamoelectric machine slot liner having two cuffs;

Figure 1:
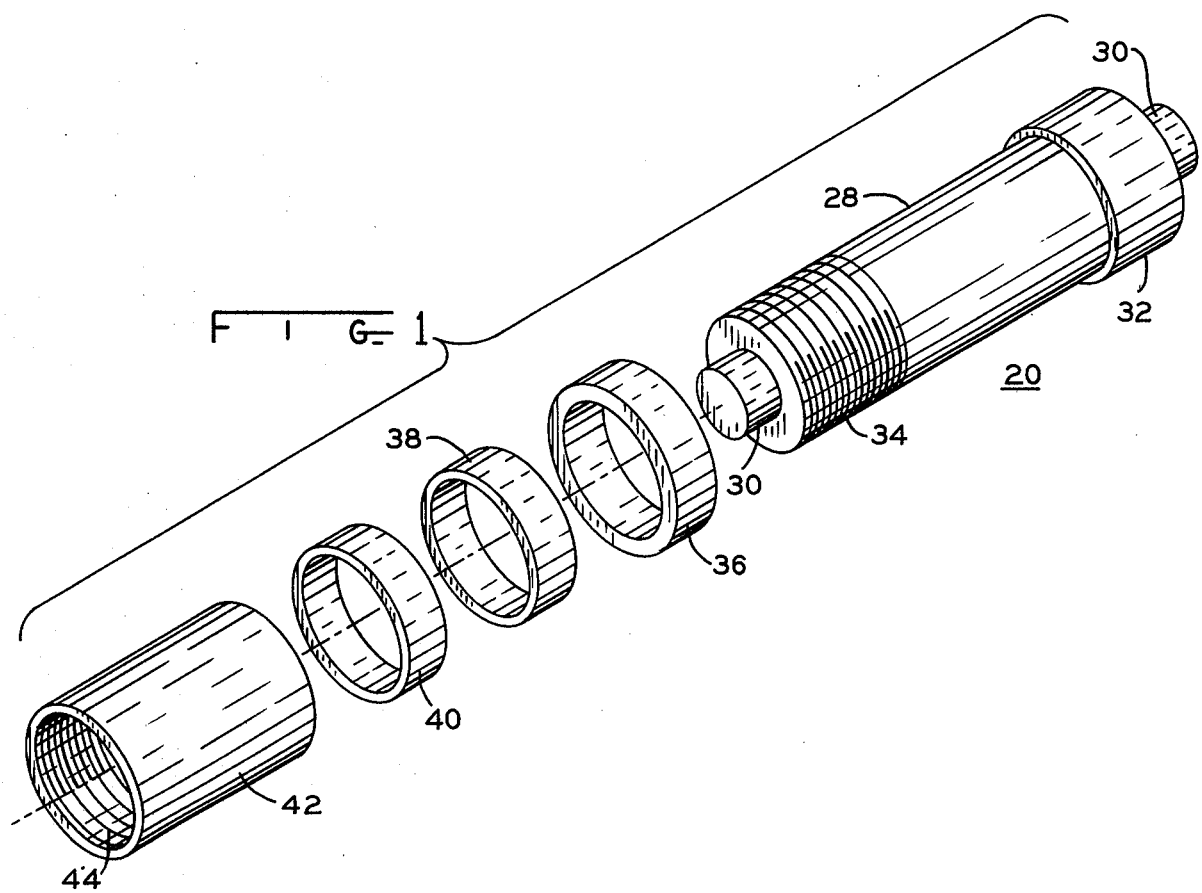
FIG. 1 is an exploded perspective view of a roller assembly that embodies the invention in one form.

The exemplifications set out herein illustrate the preferred embodiments of the invention in one form thereof, and such exemplifications are not to be construed as limiting in any manner.

DESCRIPTION OF THE PREFERRED EMBODIMENTS

Referring now to the drawings in general, electrical insulating material is threaded from a roll 10 through folding blocks 12, 13 over roller 16 and up through drive rollers 18 and 20. Folding blocks 12 and 13 fold the edge of the electrical insulating material over to form cuffs 15, 17. Folding block 13 can be adjusted toward or away from block 12 by width adjusting knob 14 to accommodate wider or narrower electrical insulating material. Material feeding means illustrated as drive rollers 18, 20 feed the cuffed insulating material up through guide arrangement 24 and into slot liner forming machine 26. Machine or apparatus 26 forms the cuffed insulating material into a predetermined configuration and cuts the electrical insulating material to the proper length and places the cuffed slot liner insulator on a device which injects the insulator into a magnetic core slot of a dynamoelectric machine.

Now referring particularly to FIG. 1, there is shown a disassembled improved roller assembly 20. Roller core or body 28 has rotatable supporting means 30 which can be rotatably supported in bearings, however when the roller is used as a feed roller then one rotatable supporting means 30 will have a pulley or a gear attached thereto to supply the drive means. One end of roller assembly 20 has a larger diameter portion 32 while the other end of roller 20 has threads 34. A resilient sleeve 36 is placed over core 28 in abutting relationship to larger diameter portion 32. Resilient sleeve 36 provides a friction drive surface. Resilient sleeve 36 can be any elastomer material which is compressible and resilient e.g., neoprene or urethane rubber. One way of making resilient sleeve 36 would be to obtain a piece of urethane rubber of a proper outer diameter and then machine a bore hole to fit roller core 28. Once resilient sleeve 36 is placed on roller core 28 then spacer shells 38 and 40 are placed on roller core 28 adjacent to resilient sleeve 36.

The quantity of spacer shells 38, 40 is optional. However, the number and width of spacer shells will govern the maximum and minimum widths of rubber-like resilient sleeve 36 that can be accommodated on a given roller. Removal of one spacer shell permits a wider resilient sleeve 36 to be installed.

A movable means illustrated as threaded sleeve 42 has threads 44 which mate with roller threads 34 so that it may be fixed at different locations and thus provide means by which resilient sleeve 36 may be compressed against an abutment means such as portion 32 thereby increasing the outer diameter of resilient sleeve 36. Conversely, threaded shell 42 can be backed off to remove the compression from resilient sleeve 36 allowing resilient sleeve 36 to be at its uncompressed outer diameter. The threads thus permit sleeve 42 to move axially along roller 20 varying the compressive force exerted on sleeve 36.

Figure 2:
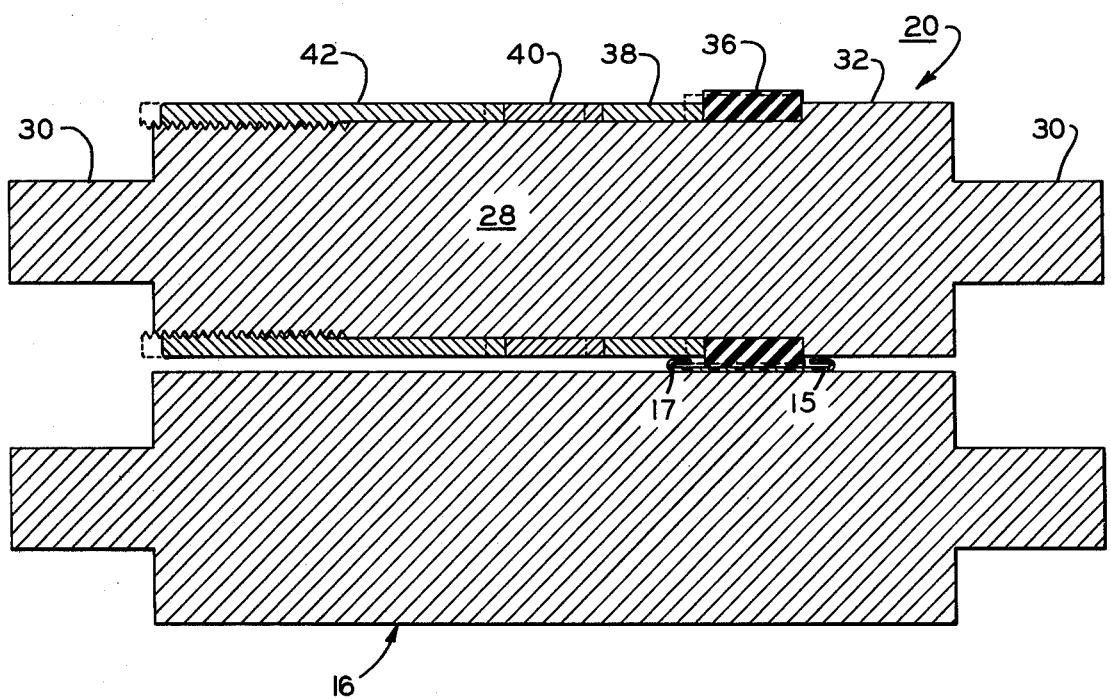
FIG. 2 is a vertical sectional view of one form of improved roller assembly and an adjacent roller feeding the slot liner insulating material.

FIG. 2 shows improved feed roller 20 cooperating with a second roller 16 to move electrical insulating material having cuffs 15, 17. Resilient sleeve 36 provides friction drive to the electrical insulating material by pinching the electrical insulating material against roller 16. The friction force or drive is applied between cuffs 15, 17. The width of the insulating material and therefore the distance between cuffs 15, 17 is determined by the height of the magnetic core into which the formed slot liners are to be placed. A cuffed slot liner insulator is described in U.S. Pat. No. 3,745,394 to Lowell M. Mason assigned to the same assignee as this application and the entire disclosure of the patent is incorporated herein by reference. When a wider resilient sleeve 36 is required one or more shell spacers 38, 40 is removed to accommodate the wider resilient sleeve 36. The difference between the outer diameter of the resilient sleeve 36 and the outer diameter of feed roller 20 is determined by the amount of pressing or ironing of cuffs 15 that is desired. If it is desired to press cuffs 15, 17 as the cuffs move between rollers 20 and 16 then threaded shell 42 is unscrewed to remove some of the compressive force on resilient sleeve 36 thereby decreasing the outer diameter of resilient sleeve 36 as illustrated in dotted lines. On the other hand if no pressing of cuffs 15, 17 is desired as the insulating material passes between rollers 20 and 16 then threaded shell 42 is tightened to increase the compressive force on resilient sleeve 36 thereby increasing this outer diameter as illustrated in solid lines. Sleeve 36, as illustrated in solid lines, is rectangular in shape in cross-section, however it will be understood that under compression sleeve 36 may not have a truly rectangular cross-sectional configuration.

If resilient sleeve 36 is at the maximum required width then there would be no need for spacer shells 38, 40 and therefore they could be eliminated. However, it is preferable to retain a small spacer between the threaded means and sleeve 36. Spacer shells 38, 40 may be made the same width as resilient sleeve 36, and then if it were desired to double or triple the width of resilient sleeve 36 one or both of spacers 38, 40 could be removed and replaced by one or two additional resilient sleeves 36 thereby providing the desired width.

In FIG. 3, when apparatus 26 is to be started, elongated electrically insulating material from roll 10 is threaded between folding blocks 12, 13 and between rollers 16, 20 then back up between rollers 18 and 20 and into guide arrangement 24 which guides the elongated electrically insulating material into insulator fabricating means of apparatus 26 where it is formed and cut to the proper dimension and then may be inserted into a magnetic core slot. One or both folding blocks 12, 13 may have a spiral groove extending along the inner edge of the folding block to fold the edge of the insulating material over to form cuffs 15, 17. Roller 16 provides a surface over which the direction of insulating material may be changed prior to its passing between rollers 18, 20.

The distances between rollers 16 and 20 and rollers 18 and 20 is determined by the thickness of insulating material, the amount, if any, of pressing that is to be done to the cuffs 15, and the outer diameter of resilient sleeve 36. If the feed force provided by the rollers is not proper then apparatus 26 can not consistently cut the slot liners to their proper length or if apparatus 26 is equipped with a detector to sense an inadequate supply of material to form an insulator then the apparatus will cease operation. It will therefore be understood why it is important to have an improved feed roller such as roller assembly 20 which is easily adjustable to maintain the proper feed force for the different insulating materials used and the various widths of insulating material required. When a polyester insulating material is fed between the rollers, normally the outer diameter of resilient sleeve 36 is reduced so that the polyester material is ironed or pressed as it passes through the rollers. However, when feeding a paper insulator material between the rollers any additional pressing at this point could cause cuffs 15, 17 to be ironed flat and therefore not to perform properly when placed in a magnetic core slot.

Feed rollers 18, 20 receive their driving force from drive gear 22. A detailed description of the operation of the apparatus 26 is not given herein since it is not necessary for an understanding of this invention. However, the operation of such an apparatus can be found in U.S. Pat. No. 3,778,890 to Leo M. Schlaudroff and assigned to the assignee of this application, the disclosure of which is incorporated herein by reference or in U.S.

Pat. No. 3,702,498 to Lowell M. Mason and assigned to the assignee of this application, the disclosure of which patent is also incorporated herein by reference. Folding block 13 is adjustably mounted so that, by rotation of width adjustment knob 14, wider or narrower strips of insulating material may be accommodated between folding blocks 12, 13.

A slot insulator 46 is illustrated in FIG. 4 having a single cuff 19. Slot insulator 46 is of the type used in a magnetic core slot for a dynamoelectric machine to insulate winding coils from the magnetic core. FIG. 5 illustrates a slot liner or slot insulator 47 having two cuffs 15, 17; slot insulator 47 is also used, as slot insulator 46, to insulate winding coils from the magnetic core. Slot liners 46, 47 are formed by apparatus 26 (illustrated in FIG. 3). The cuffed insulating material being fed between rollers 16, 20 in FIG. 2 is of the type that can be used to form slot insulator 47.

Figure 6:
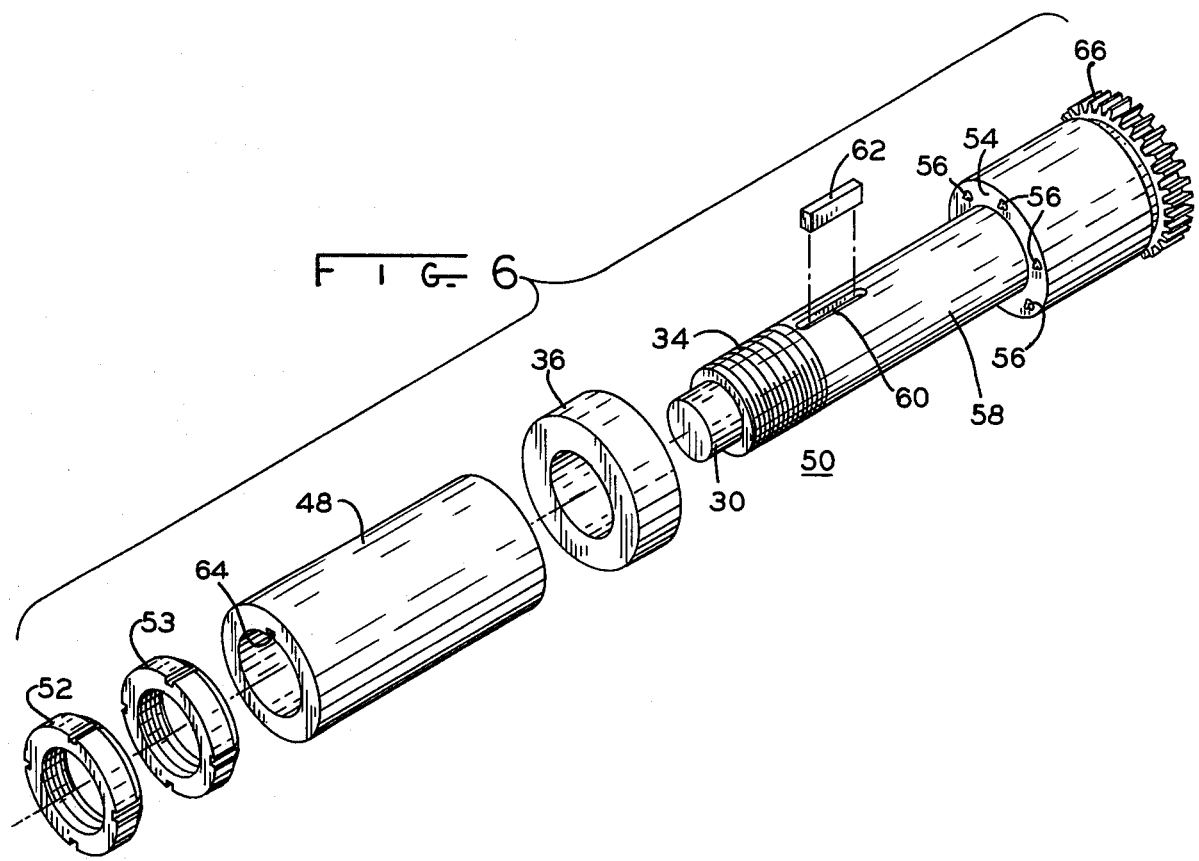
FIG. 6 is an exploded perspective view of a preferred embodiment of improved roller assembly.

A preferred embodiment of improved roller assembly is illustrated in FIG. 6 as roller assembly 50 having roller core or body 58 with a larger diameter portion forming shoulder or abutment 54 against which rubber or resilient sleeve 36 is placed. An abutment means illustrated as shoulder 54 has several set pins 56 which grip resilient sleeve 36 when the resilient sleeve is pressed against shoulder 54 and although a plurality of set pins 56 are illustrated it will be understood that set pins are optional and may or may not be required. In addition various other types of projections could be used in order to prevent slipping of sleeve 36 as roller core 58 rotates. Roller core 58 has a keyway slot 60 to receive a key 62. As shell or spacer 48 is placed on roller body 58 contiguous to resilient sleeve 36, key 62 mates with slot 64 in shell 48 to ensure that shell 48 is maintained in fixed rotational relationship to roller core 58.

Movable means illustrated as locknuts 52, 53 are threaded onto threads 34 of roller body 58 to hold resilient sleeve 36 and shell 48 in place. Threads 34 provide means by which locknuts 52 can move axially along roller assembly 50 thereby permitting varying amounts of compressive force to be applied to resilient sleeve 36. In additon the threaded arrangement provides for easy disassembly of roller 50 so that resilient sleeve 36 may be replaced. Roller 50 has rotatable supporting portion 30 on which a bearing may be accommodated. Gear 66 positioned on one end of roller 50 is used to transmit a driving force to the roller.

Figure 7:
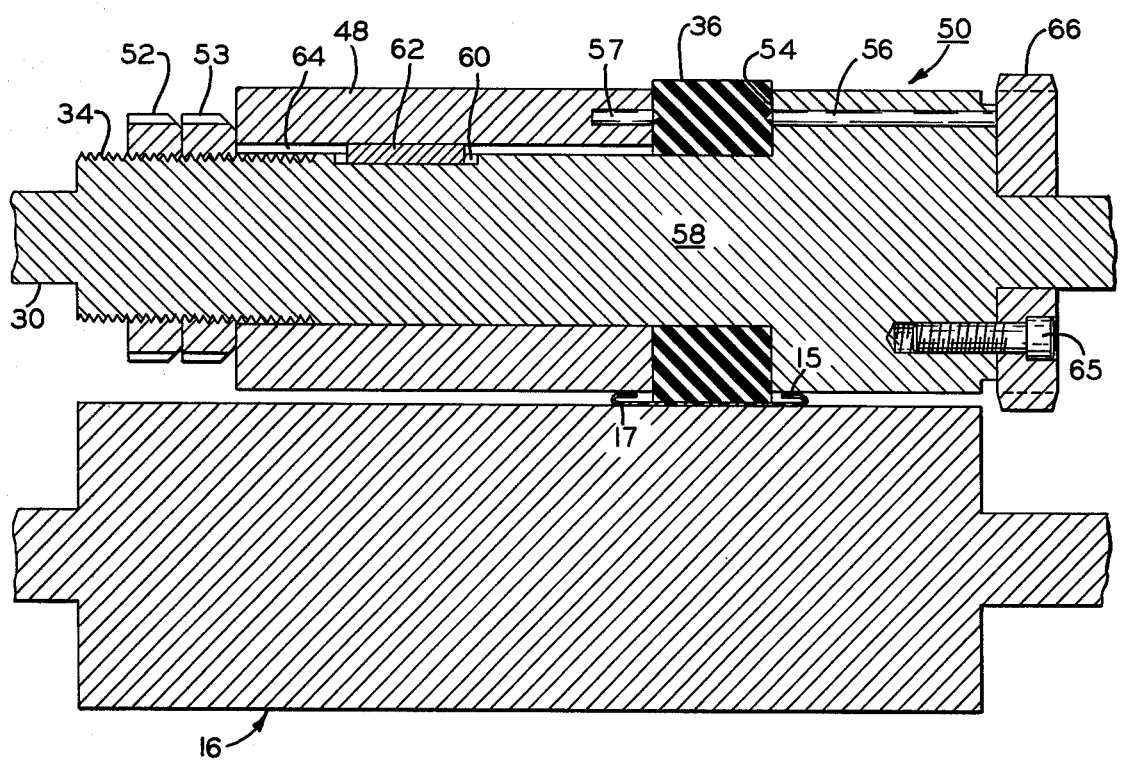
FIG. 7 illustrates a vertical sectional view of the preferred form of improved roller assembly and an adjacent roller feeding the cuffed slot liner insulating material.

As illustrated in FIG. 7, roller 50 cooperates with roller 16 to feed an electrical insulating material having cuffs 15, 17. Screw 65 secures gear 66 to roller 50 so that as gear 66 rotates motion is imparted to the roller. Although only one screw 65 is shown, it will be understood that more than one screw is used. FIG. 7 is actually a diagonal, with an offset, sectional view taken through roller 50 to illustrate a greater number of structural features thereof. As roller 50 is rotated a friction drive is provided by the outer surface of resilient sleeve 36 to the insulation material. The amount of friction drive can be increased, without changing the relative position of rollers 16 and 50, by threading locknuts 52, 53 further toward gear 66 thereby increasing the compressive force exerted on resilient sleeve 36 against shoulder or abutment 54 which causes the outer diameter of resilient sleeve 36 to increase and apply an increased amount of friction drive to the insulating material. Of course, if the outer diameter of resilient sleeve 36 were to decrease from wear, it could be restored simply by moving locknuts 52, 53 to increase the compressive force applied to the resilient sleeve, and would not necessitate a replacement of the roller or of the resilient sleeve.

Slippage preventing means illustrated as set pins 56, 57 ensure that resilient sleeve 36 does not slip during rotation of roller 50 thereby failing to provide the friction drive to the strip insulating material. Set pin 57 is press fitted into shell 48 and serves a redundant function to set pin 56, and in less severe applications could be omitted. Shell 48 could be replaced with one of different width to allow accommodation of a different width resilient sleeve 36 or alternatively shell 48 could be divided into smaller shells to permit accommodating a wider resilient sleeve by removal of one of the smaller shells.

Although as illustrated in FIG. 7 roller core or body 58 is all one piece having shaft or rotatable supporting portion 30, it will be understood that roller body 58 could be a separate piece mounted on a shaft. Alternatively, abutment 54 could be provided by a piece (e.g., a washer) affixed to a shaft against which a rubber-like sleeve could be compressed.

Although the improved roller has been described in conjunction with an apparatus to make slot liners for dynamoelectric machines, it will be appreciated that the improved roller could be used in other strip feeding apparatus, especially where a drive surface having a higher coefficient of friction than a smooth metal surface is required.

It will now be appreciated that I have provided an improved feed roller assembly which allows the distance between the improved roller assembly and a second roller to be increased while maintaining a constant force between a resilient sleeve and a strip material being fed between the rollers. It will also be appreciated that my improved roller assembly has an easily replaceable resilient sleeve which may also readily be replaced by a wider or narrower resilient sleeve. In addition strip materials of different thicknesses can be fed between the rollers by simple adjustment to the improved roller itself without relative movement of the rollers. Normally, when the rollers are readjusted closer together or further apart, a check or inspection is required to assure that the rollers are left in parallel relationship, but my improved roller eliminates changing the parallel relation of the rollers for strip material thicknesses that are within the adjustment range provided by the resilient sleeve.

Consequently, while in accordance with the Patent Statutes, I have described what at present are considered to be the preferred forms of my invention it will be obvious to those skilled in the art that numerous changes and modifications may be made herein without departing from the true spirit and scope of the invention, and it is therefore aimed in the following claims to cover all such modifications.

What I claim as new and desire to secure by Letters Patent of the United States is:

1. In an improved apparatus for making a magnetic core slot insulator, wherein the apparatus comprises a machine frame, insulator fabricating means supported by the machine frame for forming strip pieces of insulation for insertion into slots of a magnetic core, and material feeding means having at least one roller assembly cooperating with at least one other roller to move insulator material, the improvement comprising: the at least one roller assembly having a first portion and a second portion, and a resilient sleeve for pinching the insulator material against the other roller; the first portion having an abutment against which the resilient sleeve is compressed in an abutting relationship; the second portion having threads thereon; and movable means movable axially along the second portion and threadedly mated with at least some of the threads of the second portion for compressing the resilient sleeve against the abutment of the first portion and for controlling the outer diameter of the resilient sleeve; movement of the movable means in a direction to increase compression of the resilient sleeve causing an increase in outer diameter of the resilient sleeve whereby compensation is made for wear of the resilient sleeve.

2. A roller assembly for use in a strip feeding assembly to feed electrical insulating material to an insulator fabricating machine, the roller assembly having: a first portion, a second portion, and rotatable mounting means, with the first portion being of a greater diameter than the second portion; a resilient sleeve on part of the second portion, adjacent the first portion, and having a friction surface for frictionally engaging the electrical insulating material; a shell on the second portion contiguous to the resilient sleeve; and means, placed on the second portion, fixable at different locations along the second portion for holding the shell in compressed relationship against the resilient sleeve, thereby to provide a roller assembly with a readily replaceable resilient sleeve; the outer diameter of the resilient sleeve being determined by the compressive force exerted thereagainst by the shell.

3. A roller drive assembly for use in an apparatus for fabricating magnetic core insulators, the roller drive assembly comprising: a body for supporting a compressible resilient sleeve having a friction drive surface for engaging electrical insulating material; abutment means against which the resilient sleeve is compressible; and compression applying means movable relative to the abutment means in an axial direction and fixable in different axial positions relative to the abutment means; the outer diameter of the resilient sleeve being determined by the relative distance between the abutment means and the compression applying means, with the friction driving force of the resilient sleeve being determined by the outer diameter thereof, and the compression applying means being easily removable to permit replacement of the compressible resilient sleeve.

4. The invention of claim 3 wherein the abutment means includes slippage preventing means contacting the resilient sleeve so that the resilient sleeve remains in fixed angular relationship to the abutment means.

5. The invention of claim 3 wherein a spacer is located between the resilient sleeve and the compression applying means thereby to permit selective accommodation of resilient sleeves of different axial lengths.

6. The invention of claim 5 wherein locking means hold the spacer in fixed relationship to the body to ensure that the spacer rotates with the body.

7. For use in a machine for making insulators for dynamoelectric machines and having a feed roller assembly for feeding electrical insulating material through the machine; a feed roller assembly comprising: a core having rotatable mounting means, abutment means, and a threaded portion; a resilient sleeve having a portion adjacent to the abutment means and surrounding a predetermined portion of the core to provide a friction drive directly to insulating material; and threaded means threadedly engaging the core for applying compressive forces to the resilient sleeve against the abutment means and for controlling the outer diameter of the resilient sleeve.

* * * * *